Sept. 26, 1933.  R. B. HORNACK  1,928,129
SOLDERING IRON
Filed Sept. 26, 1930
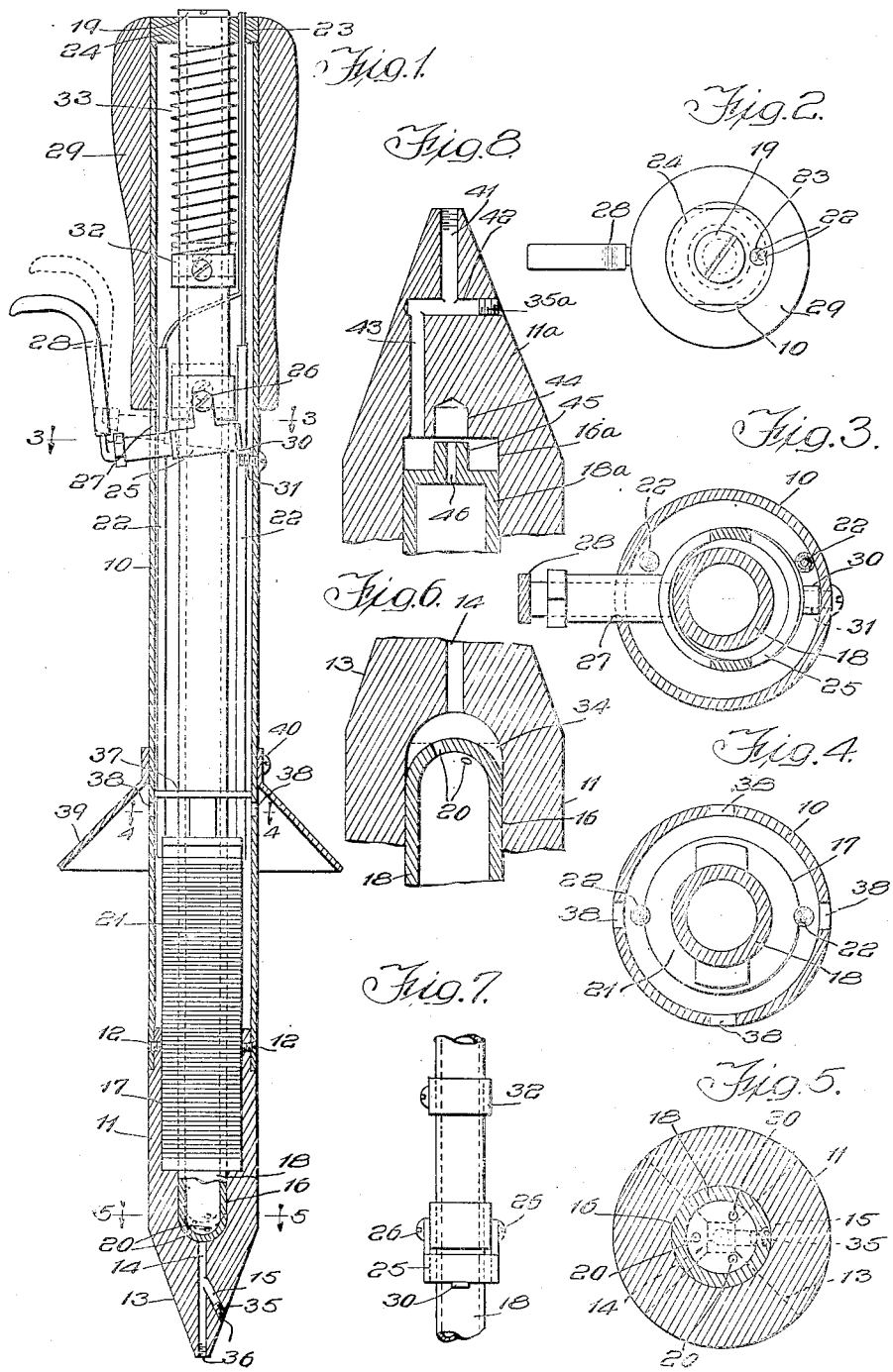
Witness:
William P. Kilroy
Inventor:
Robert B. Hornack Patented Sept. 26, 1933

1,928,129

UNITED STATES PATENT OFFICE 1,928,129

SOLDERING IRON

Robert B. Hornack, Chicago, Ill.

Application September 26, 1930
Serial No. 484,529

14 Claims. (Cl. 219—27)

This invention relates generally to soldering irons, and in its present embodiment relates particularly to that class of irons wherein an electrically operated heating coil is employed for heating the head of the iron and maintaining the head in heated condition.

One object of the present invention is to provide a device of the character described which will enable the handling of the iron and solder with one hand, thereby leaving the other hand of the user free for holding or positioning the parts being soldered, wiping the joint, or for other uses as may be found desirable.

Another object of the invention is to provide a construction and arrangement wherein the heating element employed for heating the head may also be employed for simultaneously conditioning the solder for use and maintaining it in a fluid or molten condition.

Another object of the invention is to provide novel means for feeding or discharging and controlling the feed or discharge of solder from the head of the iron.

Another object of the invention is to provide a structure of the character described having suitable ventilating means associated therewith for minimizing the transmission of heat to the handle and to the means for controlling the discharge of solder from the device.

Another object of the invention is to provide a construction and arrangement whereby the solder may be forcibly discharged from the device in a manner to permit the use of the iron in the soldering of overhead joints, or in places where the handling of the iron above the work is inconvenient or impossible.

A further object of the invention is to provide means whereby the solder may be discharged at the extreme point of the head or at the side thereof as desired.

A still further object of the invention is to improve devices of the character disclosed in sundry details hereinafter described and particularly pointed out in the appended claims.

One embodiment of the present invention is shown for illustrative purposes in the accompanying drawing in which Fig. 1 is a longitudinal sectional view of a soldering iron embodying features of the present invention;

Fig. 2 is an end or plan view of the device shown in Fig. 1;

Fig. 3 is an enlarged transverse sectional view taken substantially as indicated by the line 3—3 of Fig. 1;

Fig. 4 is an enlarged transverse sectional view taken on the line 4—4 of Fig. 1;

Fig. 5 is an enlarged transverse sectional view through the head and solder tube or receptacle taken as indicated by the line 5—5 of Fig. 1;

Fig. 6 is an enlarged fragmentary longitudinal sectional view of a portion of the solder receptacle illustrating a part of the solder feeding or discharging means in a changed position;

Fig. 7 is an enlarged fragmentary elevational view of a portion of the solder discharge means; and Fig. 8 is an enlarged fragmentary elevational sectional view similar to Fig. 6 illustrating a slightly modified construction of the solder feeding or discharging means.

The illustrative embodiment of the present invention comprises a body or casing member 10, to one end of which a head 11 is secured by means of screws 12, the head, in the present instance, having a pointed or tapered end portion as indicated at 13 and provided with a port 14 positioned preferably adjacent the central portion, and provided also with a port 15 communicating with the central port 14 and terminating at one of the faces of the tapered end portion.

Formed in the head 11 preferably adjacent its central portion is a recess 16 and a counter bore 17 of somewhat larger diameter, the recess 16 being adapted to receive one end of a tubular receptacle 18 for containing the solder, the said receptacle extending longitudinally of the casing member 10 and provided at its opposite end with a screw plug 19.

The lower end of the receptacle 18 is shown in the illustrative embodiment as of semi-spherical form adapted to cooperate with and engage the bottom of the recess 16 having a similar formation, and formed in the lower end of the receptacle are preferably a plurality of apertures 20 offset laterally from, or out of register with, the port 14, and through which solder may flow to the port 14 when the receptacle is lifted from its seat in the bottom of the recess 16. It will be observed that by such an arrangement, the cooperation of the lower end of the receptacle 18 and the bottom of the recess 16 provides a valve-like structure for controlling the flow of solder from the receptacle to the head.

Positioned within the counter bore 17 and preferably surrounding the receptacle 18 adjacent its lower end portion is an electrically operated heating element 21 having suitable conductors 22 attached thereto and extending longitudinally within the casing member 10, from which they emerge at the upper end thereof through an aperture 23 formed on a cap 24 to be connected to any suitable source of current supply. It will be observed that by such an arrangement, the heating element 21 serves to heat the head 11 of the soldering iron and maintain the solder in the receptacle 18 in a fluid or molten condition.

For controlling the movements of the receptacle 18 in the manner to control the flow of fluid from the receptacle to the port 14, a lever 25 is pivotally mounted at 26 on the receptacle and adapted to extend outwardly through an elongated aperture 27 formed in the casing member 10, the outer end of the lever being provided with an upturned trigger portion 28 adapted to be positioned conveniently adjacent a grip or handle portion 29 mounted on the upper or adjacent end of the casing member 10. The lever 25 is provided with a lip 30 at the opposite side of the pivot from the trigger portion and adapted to engage the upper side of a stop 31 shown in the present instance as a screw mounted in the side of the casing member 10 to provide a fulcrum for the lever 25. Secured to the receptacle 18 above the lever 25 is a collar 32 between which and the cap 24 is positioned a compression spring 33 surrounding the receptacle and acting to urge the receptacle downwardly in a manner to snugly seat the lower end thereof in the bottom of the recess 16 formed in the head 11 thereby serving to retain the molten solder in the receptacle and prevent its passage to the ports 14 and 15.

For releasing the molten or fluid solder from the receptacle, it will be observed that by moving the lever 25 to the dotted line position shown in Fig. 1 by exerting pressure on the trigger 28, the receptacle 18 will be moved longitudinally of the casing member 10 in one direction and in a manner to lift the lower end of the receptacle from its seat at the bottom of the recess 16, thereby permitting the molten solder to flow through the apertures 20 to the ports 14 and 15, from which it is discharged and applied to the connections to be soldered. When sufficient solder has been deposited, the trigger 28 may be released permitting the spring 33 to move the receptacle downwardly or in the opposite direction in a manner to seat the lower end of the receptacle in the bottom of the recess 16 thereby preventing further discharge of solder from the receptacle.

It will be observed from the foregoing description that the present invention provides a most desirable and practical device by which the soldering iron and solder may be conveniently handled by one hand of the operator, leaving his other hand free for handling or positioning the parts to be soldered, wiping the joint or for other uses which may be found desirable.

Another feature of the present invention which is of considerable importance is the use of the device for soldering overhead connections, or its use in places where the handling of the soldering iron above the work is inconvenient or impossible. In this connection, it will be observed that while the iron is in the position shown in Fig. 1, a temporary dam of any suitable material may be positioned or held over the discharge end of the port 14 while the solder receptacle is lifted from its seat, thus permitting the port 14 and the lower end of the recess 16 to fill with molten solder, and while the receptacle is retained in its raised position, the iron may be inverted or changed to the position shown in Fig. 6, where it will be observed that the structure and arrangement provides an annular space or pocket 34 between the reduced end portion of the receptacle and the wall of the recess 16. While in this position, the head or discharge end of the port 14 may be placed adjacent the joint to be soldered and by releasing the trigger 28, the spring 33 will act to force or eject the solder from the pocket 34 through the port 14 and on to the work, the pressure within the receptacle due to the heated condition of the molten solder therein serving to prevent any material amount of the solder in the pocket 34 from reentering the receptacle during the discharge of solder through the port 14.

Under certain conditions, it has been found desirable to discharge the solder at the side of the head rather than at the extreme point thereof, and to take care of such a condition, the port 15 has been provided in which, as shown in Fig. 1, is positioned a plug 35 which, if desired, may be inserted in the screw-threaded end 36 of the port 14, thus permitting the solder to be discharged through the port 15.

By reference to Fig. 8, it will be noted that the modified construction illustrated therein contemplates a head 11a having a plurality of ports 41 and 42 formed therein, the said ports corresponding in function to the ports 14 and 15, respectively, of Fig. 1, and adapted to communicate with the recess 16a through a port 43. It will be noted also that the bottom of the recess 16a in the modified structure shown in Fig. 8 is provided with a depression 44 adapted to receive a projection 45 formed on the adjacent or discharge end of the solder receptacle 18a, and that the projection 45 is provided with a longitudinally extending aperture 46 adapted to communicate with the interior of the receptacle.

The projection 45 is adapted to closely and slidably fit within the walls of the depression 44 to prevent the passage of solder to or from the depression when the projection is in engagement therewith, and it will be noted that by such an arrangement, when the iron is in the position shown in Fig. 1 and the end of the port 41 covered as above described with reference to the structure shown in Fig. 1, the receptacle 18a may be moved longitudinally in the recess 16a to the position shown in Fig. 8, thereby permitting molten solder to fill the ports 41, 42 and 43 and the depression 44 and recess 16a, and that upon movement of the receptacle 18a toward the bottom of the recess, the end of the projection 45 upon entering the mouth of the depression 44 will close the passage between the recess 16a and the interior of the solder receptacle, and that the continued movement of the receptacle will force the solder contained in the recess and ports 41, 42 and 43 outwardly through the ports 41 or 42, depending upon which of the ports is closed by the plug 35a, while the solder contained in the depression 44 will be forced, or permitted to flow back, into the receptacle through the aperture 46 depending upon the position of the soldering iron.

From the foregoing description, it will be noted that the construction shown in Fig. 8 provides a practical and efficient means for forcibly ejecting the solder from the recess 16a which has been found most desirable in soldering overhead connections or where the use of the iron above the work is inconvenient or impossible.

For preventing the transmission of heat from the element 21 to the handle portion 29 of the device, a washer or baffle 37 of suitable heating insulating material is positioned between the heating element 21 and handle portion 29, while between the heat insulating baffle 37 and the heating element 21, the casing member 10 is provided with a plurality of apertures 38 to permit circulation of air through the heated end portion of the casing to carry off an excess of the heat generated therein.

To further protect the hand of the operator from the heat issuing from the ports 38, an annular shield 39 is suitably mounted on the casing member 10 and secured thereto by a screw 40, the walls of the shield being inclined to the casing member in a manner to deflect the heat away from the handle portion of the device.

It will be observed from the foregoing description that the present invention provides a novel construction and arrangement whereby both the iron and the solder employed may be conveniently handled, the flow of solder controlled, and by the use of which device, overhead joints may be soldered.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to cover by Letters Patent is:

1. A soldering iron comprising, in combination, a head having a port formed therein, a casing member secured to said head and having a handle portion, a solder receptacle mounted in said head and having an aperture operatively related to the port formed in the head, said receptacle being relatively movable with respect to the head for establishing communication between said aperture and port, a heating element mounted in said head and surrounding said receptacle for heating the head and maintaining the solder in the receptacle in a molten condition, and manually operated means for moving said receptacle to control the flow of solder therefrom.

2. A soldering iron comprising, in combination, a head having a port formed therein, a casing member secured to said head and having a handle portion, a solder receptacle mounted in said head and having an aperture operatively related to the port formed in the head, said receptacle being longitudinally movable with respect to said head for establishing communication between said aperture and port, a heating element mounted in said head and surrounding said receptacle for heating the head and maintaining the solder in the receptacle in a molten condition, and manually operated means carried by said receptacle and cooperable with said casing member for moving the receptacle to control the flow of solder from the receptacle to said port.

3. A soldering iron comprising, in combination, a head having a port formed therein, a casing member secured to said head and having a handle portion, a relatively movable solder receptacle mounted in said head and having an aperture formed adjacent one of its end portions adapted for communication with the port in said head, a heating element operatively related to said head and receptacle for heating the head and maintaining the solder in the receptacle in a molten condition, and manually operated means for moving said receptacle to control the flow of solder from said aperture to said port.

4. A soldering iron comprising, in combination, a head having a plurality of ports formed therein, a casing member having a handle portion, a solder receptacle mounted therein and having apertures formed adjacent one of its end portions adapted to communicate with the port in said head, a heating element operatively related to said head and receptacle for heating the head and maintaining the solder in the receptacle in a molten condition, and manually operated means pivotally mounted on said receptacle and operatively related to said casing member for controlling the flow of solder from said apertures to said ports.

5. A soldering iron comprising, in combination, a head having a plurality of communicating ports formed therein, a casing member having a handle portion, a solder receptacle mounted therein and having apertures formed in one of its end portions adapted to communicate with the ports in said head, a heating element operatively related to said head and receptacle for heating the head and maintaining the solder in the receptacle in a molten condition, manually operated means pivotally mounted on said receptacle and operatively related to said casing member for controlling the flow of solder from said apertures to said ports, and means for closing one or another of said ports.

6. A soldering iron comprising, in combination, a head having a port formed therein, a casing member having a handle portion, a movable solder receptacle mounted therein and having an aperture formed adjacent one of its end portions, said end portion being positioned in said head and operatively related thereto in a manner to form a valve between said aperture and port, a heating element operatively related to said head and receptacle for heating the head and maintaining the solder in the receptacle in a molten condition, means for maintaining said valve normally in closed position, and manually operated means for moving said receptacle and opening the valve to control the flow of solder from said receptacle to the port in said head.

7. A soldering iron comprising, in combination, a head having a port formed therein, a casing member having a handle portion, a movable solder receptacle mounted therein and having an aperture formed adjacent one of its end portions, said end portion being slidably positioned in said head and operatively related thereto in a manner to form a valve between said aperture and port, a heating element operatively related to said head and receptacle for heating the head and maintaining the solder in the receptacle in a molten condition, resilient means for maintaining said valve normally in closed position, and manually operated means mounted on said receptacle and extending outside said member for shifting the receptacle, opening the valve and controlling the flow of solder from said receptacle to the port in said head.

8. A soldering iron comprising, in combination, a head having a plurality of ports formed therein, a casing member having a handle portion, a solder receptacle movably mounted therein and having apertures formed adjacent one of its end portions, said end portions being slidably positioned in said head and operatively related thereto in a manner to form a valve between said apertures and ports, a heating element operatively related to said head and receptacle for heating the head and maintaining the solder in the receptacle in a molten condition, resilient means operatively related to said receptacle for maintaining said valve normally in closed position, manually operated means mounted on said receptacle and extending outside said member adjacent said handle portion for moving the receptacle and opening the valve and controlling the flow of solder from the receptacle to the ports in said head, and means for closing one or another of said ports to prevent the discharge of solder therefrom.

9. A soldering iron comprising, in combination, a head having a communicating recess and a port formed therein, a casing member having a handle portion, a heating element, a solder receptacle mounted therein and having an aperture formed in one of its end portions, said end portion being positioned in said recess in a manner to provide a valve and being of a lesser diameter than that of the body portion of the receptacle to provide a space or pocket between said end portion and the wall of said recess when the receptacle is partially withdrawn from the recess, said space or pocket being adapted to contain molten solder when the head is positioned above the handle in soldering overhead connections, manually operated means for moving said receptacle longitudinally of said recess in one direction to permit the solder to flow from the receptacle into said recess, and means for moving the receptacle in the opposite direction to force the solder from said pocket and recess into said port and to stop the flow of solder from the receptacle into said recess and port.

10. A soldering iron comprising, in combination, a head having a port formed therein, a casing member connected to said head and having a handle portion, a relatively movable solder receptacle having an aperture formed therein and operatively related to the port formed in said head, an electric heating element mounted in said head and surrounding said receptacle for heating the head and maintaining the solder in the receptacle in a molten condition, said casing member having a plurality of vents formed therein adjacent said heating element for discharging the heat from said member, a shield positioned on said casing member between the handle portion thereof and said vents for deflecting the heat away from said handle, and manually operated means for moving said receptacle and controlling the flow of solder from said receptacle to the port in said head.

11. A soldering iron comprising, in combination, a casing member, a head having a communicating recess and port formed therein mounted on said member, a heating element mounted in said head and member, a solder receptacle having one of its end portions mounted in said recess, said end portion having a projection formed thereon of less diameter than that of the receptacle and having an aperture formed therein communicating with the interior of said receptacle, manually operated means for moving the receptacle longitudinally of said recess in one direction to permit solder to flow from the receptacle into said recess, and means for moving the receptacle in the opposite direction to force the solder from said recess into and through said port.

12. A soldering iron comprising, in combination, a casing member, a head having a communicating recess and port formed therein mounted on said member, a heating element mounted in said head and member, a solder receptacle slidably mounted in said heating element and having one of its end portions positioned in said recess, said end portion having a projection formed thereon of less diameter than that of the receptacle and adapted to form an annular chamber or pocket between said projection and the wall of said recess when the receptacle is partially withdrawn from the recess, said projection having an aperture formed therein communicating with the interior of said receptacle, manually operated means for moving the receptacle longitudinally of said recess in one direction to permit solder to flow from the receptacle into said recess, and means for moving the receptacle in the opposite direction to stop the flow of solder from the receptacle and to force the solder from said chamber or pocket into and through said port.

13. A soldering iron comprising, in combination, a casing member, a head mounted on said member, said head having a recess formed therein and a depression formed in the bottom of the recess and provided with a plurality of ports communicating with said recess, a heating element mounted in said head and member, a solder receptacle operatively related to said element and having one of its end portions positioned in said recess, a projection of less diameter than that of the receptacle positioned on said end portion and adapted to enter said depression, said projection having an aperture formed therein communicating with the interior of said receptacle, and means for moving said receptacle longitudinally of said recess.

14. A soldering iron comprising, in combination, a casing member, a head mounted on said member, said head having a recess formed therein and a depression formed in the bottom of the recess and provided with a plurality of communicating ports communicating with said recess, a heating element mounted in said head and member, a solder receptacle operatively related to said element and having one of its end portions positioned in said recess, a projection of less diameter than that of the receptacle formed on the end thereof and adapted to enter said depression, said projection having a longitudinally extending aperture formed therein communicating with the interior of said receptacle, means for moving said receptacle and projection longitudinally of said recess and depression, respectively, in one direction to permit solder to flow from the receptacle into said recess and ports, and manually controlled means for moving the receptacle and projection in the opposite direction to stop the flow of solder from said receptacle and to force the solder from said recess and ports.

ROBERT B. HORNACK.